Jan. 28, 1969  E. H. KURT ET AL  3,424,065
BEARING
Filed Jan. 30, 1967
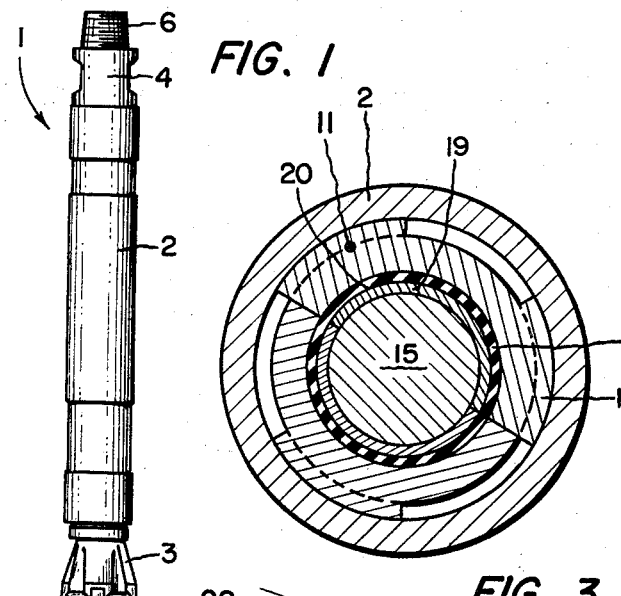
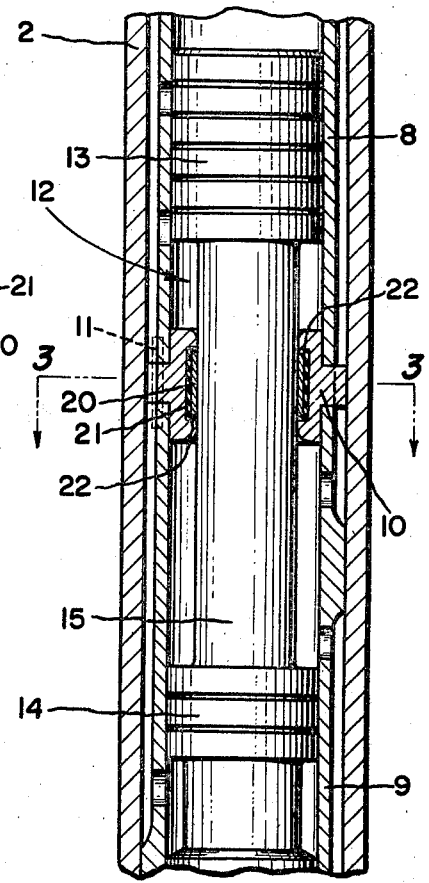
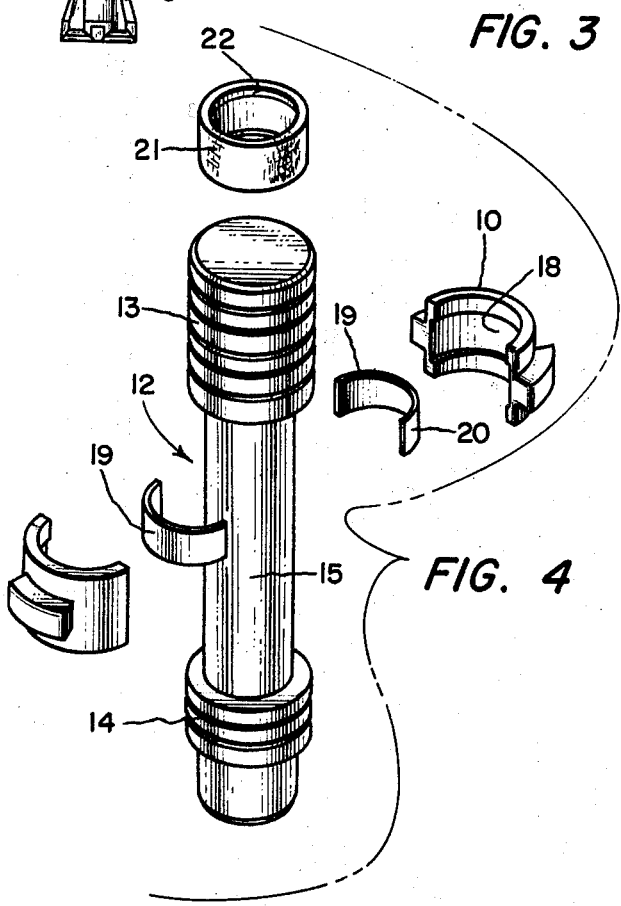
INVENTORS
EWALD H. KURT
SAMUEL P. LEWIS
EDWARD F. WICKENS
David W. Tibbott
ATTORNEY

United States Patent Office 3,424,065
Patented Jan. 28, 1969

3,424,065
BEARING
Ewald H. Kurt, Phillipsburg, Edward F. Wickens, Stewartsville, and Samuel P. Lewis, Washington, N.J., assignors to Ingersoll-Rand Company, New York, N.Y., a corporation of New Jersey
Filed Jan. 30, 1967, Ser. No. 612,683
U.S. Cl. 92—167      1 Claim
Int. Cl. F16j 15/18

ABSTRACT OF THE DISCLOSURE

A percussive rock drill containing a reciprocating piston sliding in a bearing which includes a plurality of arcuate bearing segments mounted in end-to-end abutment and grasped in a continuous circular resilient band. Both the bearing segments and the resilient band are cradled in an outer bearing support member allowing the bearing segments to move slightly in their mounting.

Background of invention

This invention relates generally to bearings and more particularly to bearings useful in rock drilling apparatus. A conventional bearing used in a downhole drill having a double headed piston is disclosed in U.S. Patent No. 3,198,264. This bearing surrounds and guides the shank interconnecting the two heads of the reciprocating piston. The bearing disclosed in this patent has several important disadvantages. For example, when it is made of a soft material such as brass or aluminum, it wears very fast and tends to deform from the shock stresses caused by the operation of the drill. When the bearing is made of a harder material such as nodular iron, it will work-harden during operation and may scuff or break the piston.

Summary of invention

The principal object of this invention is to overcome or to minimize the foregoing problems and to provide a bearing which will withstand operation in a rock drill without wearing at an unduly high rate and without deforming under the large shock stresses encountered in an operating rock drill.

Other important objects of this invention are: to provide a rock drill bearing which will adjust its axis to the piston so that the piston does not operate "cocked" in the bearing; and to provide a rock drill bearing which will absorb shock loads and large side loads without being damaged.

In general, the foregoing objects are attained in a rock drill including a reciprocating piston by providing a bearing construction slidably surrounding the piston, including a plurality of arcuate bearing segments surrounding the piston in end-to-end abutment and held in place by a surrounding resilient band. The band and arcuate bearing segments are mounted in an annular groove provided in an outer bearing supporting member which cradles the bearing and its band whereby the bearing segments can move slightly to follow the movement of the piston and to absorb shock loads without being damaged.

Brief description of drawing

The invention is described in connection with the accompanying drawing wherein:
FIG. 1 is an elevational view of a "downhole" percussion rock drill;
FIG. 2 is an enlarged fragmentary axial section of the drill of FIG. 1 and illustrating the bearing of this invention;
FIG. 3 is an enlarged section taken on the line 3—3 of FIG. 2; and FIG. 4 is a perspective and exploded view of the rock drill piston illustrating the bearing components and the order of assembly of the bearing.

Description of preferred embodiment

In general, the downhole drill 1 shown in the drawing comprises an elongated outer cylindrical body or casing 2 carrying a slidably mounted bit 3 projecting from its lower end and containing a percussive mechanism for delivering periodic impacts to the bit 3 during the drilling of a hole in the earth. The drill further contains a backhead 4 which is threaded into the upper end of the casing 2 and contains an axial passage for receiving fluid pressure. The backhead 4 has threads 6 at its upper end adapted to be attached to the lower end of a drill string of pipes (not shown) which supports the drill 1 in its hole and conveys pressure fluid to the axial bore for operating the percussion mechanism of the drill 1.

A pair of inner cylinders 8 and 9 are snugly inserted in axially aligned relationship inside of the casing 2. These cylinders are designated upper and lower cylinders 8 and 9, respectively, and are located in the upper and lower portions of the casing 2, respectively. The upper and lower cylinders 8 and 9 are spaced from each other by a spacer ring 10 which abuts the adjacent ends of the two cylinders 8 and 9. The outer diameter of the spacer ring 10 is slightly smaller than the inner diameter of the casing 2 so that it is free to slide in the casing 2 with the cylinders during assembly of the drill 1. The cyinders 8 and 9 and the spacer ring 10 are circumferentially indexed together by a longitudinal pin 11 fitting into corresponding holes in the cylinders 8 and 9 and in the spacer ring 10 to prevent relative rotation between these three elements.

A two-headed piston 12 is slidably mounted in the cylinders 8 and 9. The piston 12 is shaped somewhat like a weight lifter's dumbbell and includes upper and lower heads 13 and 14 respectively interconnected by an integral rod or shank 15 of smaller diameter. The piston shank 15 slides snugly in the spacer ring 10 while the two piston heads 13 and 14 slide in the respective cylinders 8 and 9. The spacer ring 10 serves as an end wall between the adjacent ends of the upper and lower cylinders 8 and 9.

The spacer ring 10 is formed of a pair of semi-arcuate segments and contains an internal groove 18 circling the piston rod 15. The groove 18 contains a pair of semi-arcuate bearing segments 19 forming a bearing 20 and a resilient band 21 circling and holding the bearing segments 19 in position around the piston rod 15.

The segments 19 of the bearing 20 are sized to abut each other end-to-end around the rod 15 with a slight clearance between the rod and bearing so that the piston rod 15 is free to reciprocate. The bearing 20 is composed of a suitable bearing material such as brass or aluminum.

The resilient band 21 is continuous and includes edge flanges 22 extending radially inward over the edges of the bearing 20 to snugly grasp the bearing segments 19 and hold them in end-to-end abutment. The band 21 must be sufficiently stretchable to pass over a head 13 of the piston 12 without being permanently deformed from its normal shape wherein it can support the bearing segments 19 in end-to-end relationship.

The annular groove 18 in the spacer ring 10 is dimensioned to snugly receive or cradle the resilient band 21 and the bearing segments 19. When assembled, the resilient band 21 allows the bearing 20 to move slightly in the spacer ring 10 to float with the piston 12, to adjust its alignment with the piston to eliminate the bearing 20 from being "cocked" relative to the piston 12 and to absorb the normal shock loads encountered in a rock drill without being deformed or wearing at an unduly high rate.

We claim:
1. In a percussive rock drill including a casing containing a reciprocating piston, a bearing construction slidably surrounding said piston and comprising:
  a plurality of arcuate bearing segments composed of bearing material and sized to surround said piston when assembled in circumferential end-to-end relationship with sufficient clearance therebetween to allow said piston to reciprocate freely therein;
  a continuously circular resilient band circling said bearing segments to hold them in place around said body;
  said resilient band including flanges on each edge extending radially inward to overlap and grasp the axial edges of said arcuate bearing segments to cradle them and support them against substantial axial movement;
  an outer member circling said band and containing an annular groove snugly cradling said resilient band and said segments whereby said segments are resiliently insulated from said outer member by said resilient band and can move slightly in said outer member to follow said piston and are protected against shock caused by operation of said rock drill; and
  said outer member being separable into a plurality of sections to enable its being assembled around said band and bearing segments and being held in assembled position by said casing.

References Cited

UNITED STATES PATENTS

| | | | |
|---|---|---|---|
| 160,426 | 3/1875 | Harrison | 308—26 X |
| 1,931,026 | 10/1933 | Lee | 308—26 |
| 1,985,781 | 12/1934 | Hufferd et al. | 308—26 |
| 2,642,318 | 6/1953 | Ricks | 308—26 |
| 2,738,240 | 3/1956 | Parsons | 308—26 |
| 3,198,264 | 8/1965 | Oelke et al. | 173—73 |

FOREIGN PATENTS

| | | |
|---|---|---|
| 12,514 | 5/1898 | Great Britain. |
| 610,703 | 10/1960 | Italy. |
| 135,773 | 5/1960 | U.S.S.R. |

MARTIN P. SCHWADRON, *Primary Examiner.*

IRWIN C. COHEN, *Assistant Examiner.*

U.S. Cl. X.R.

308—4, 26